Jan. 19, 1926.
J. W. WALSH
SPRAY BASKET
Filed May 1, 1925
1,570,417
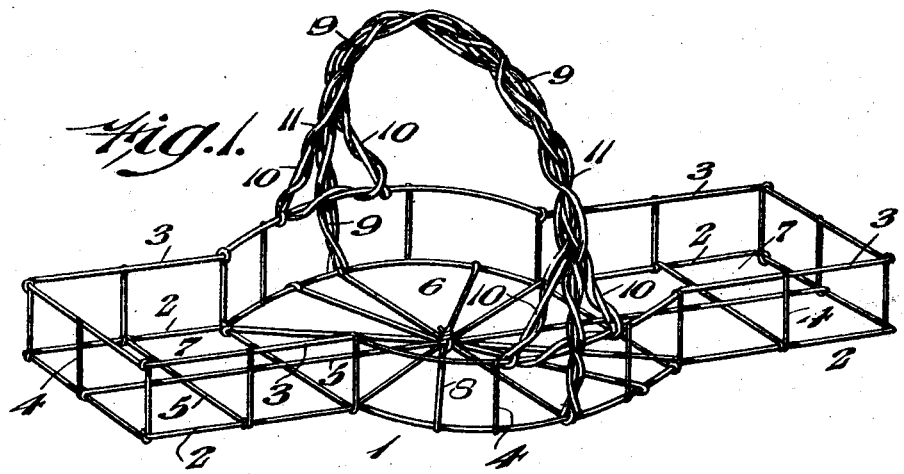
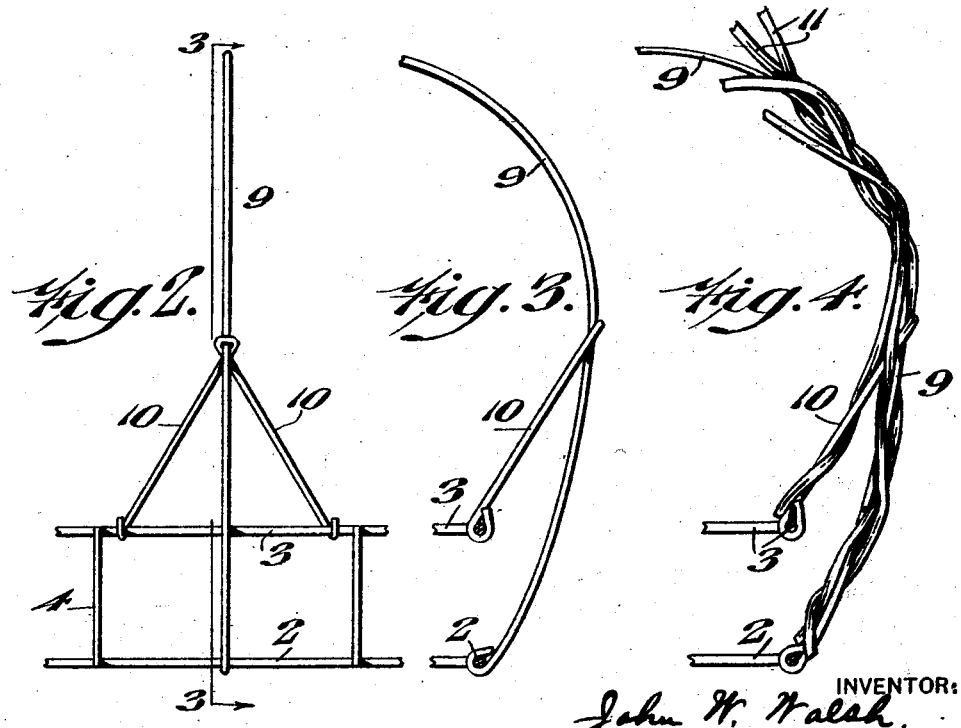
INVENTOR:
John W. Walsh.
BY
ATTORNEYS Patented Jan. 19, 1926.

1,570,417

UNITED STATES PATENT OFFICE.

JOHN W. WALSH, OF PHILADELPHIA, PENNSYLVANIA, ASSIGNOR TO HARRY BAYERSDORFER AND SYDNEY H. BAYERSDORFER, A COPARTNERSHIP TRADING AS H. BAYERSDORFER & CO., OF PHILADELPHIA, PENNSYLVANIA.

SPRAY BASKET.

Application filed May 1, 1925. Serial No. 27,178.

*To all whom it may concern:*

Be it known that I, JOHN W. WALSH, a citizen of the United States, residing in the city and county of Philadelphia and State of Pennsylvania, have invented a new and useful Spray Basket, of which the following is a specification.

My invention relates to a new and useful florists' spray basket, composed of a skeleton wire frame for the reception of a layer of moss into which flowers or ferns may be set so as to completely hide and conceal from view the skeleton basket and having a handle also of a skeleton wire and surrounded by strands of reed or other suitable basket material interwoven about said wire skeleton handle so as to simulate a genuine woven basket handle.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Referring to the drawings, in which like reference characters indicate like parts:

Figure 1, represents a perspective view of a novel florists' skeleton spray basket embodying my invention.

Figure 2, represents a view of a side elevation of a portion of the basket where the skeleton wire of the handle is joined to the frame of the basket.

Figure 3 represents a section on line 3—3 of Figure 2, with the cane strands removed from the handle.

Figure 4 represents a view similar to that shown in Figure 3, showing the manner in which the cane strands are interwoven with the skeleton handle.

Referring to the drawings, 1 designates a shallow skeleton frame of my novel spray basket formed of the lower and upper parallel frame wires 2 and 3, respectively extending completely around the outline of the basket and made in any suitable shape, depending upon the desired shape of the finished spray basket, and joined by a number of vertical side wall members 4 throughout the periphery of the basket spaced at suitable distances. A number of longitudinal and transverse wires 5, are extended across from side to side and from end to end of the lower frame member 2, and secured thereto. In the particular illustration of my invention, there is shown a plan outline of a basket composed of the circular central portion 6 and the oblong and rectangular end portion 7. The central portion 6 may be further provided with a number of radial bottom members 8, extending across the corresponding curved portions of the bottom frame members 2. The vertical side members 4 as well as the bottom members 5 and 8 may be secured to the frame members 2 and 3 in any suitable manner such as by looping them around the wires, by crimping or by spot welding.

The handle is composed of the skeleton wire 9, extending from the center of the bottom frame member 2 on one side in a curved path, to the center of the bottom frame member 2 on the opposite side and is secured in a manner shown in Figures 3 and 4. A brace wire 10, extending from the upper frame member 3 at each side of the handle wire 9, as shown in Figure 2, and looped around the handle wire 9, adds further support to the skeleton frame of the basket. The reed strands 11 are woven about the handle wire 9 and the brace wire 10 in such a manner as to substantially conceal, and at the same time provide a handle of substantial thickness and body as shown particularly in Figures 1 and 4.

The skeleton basket thus produced is filled with moss and various flowers or ferns are then set into the moss thereby producing the effect of a layer of moss or other green vegetation with the various flowers or ferns set into the same without any visible basket or frame surrounding or supporting the same. The composite wire and reed handle 11, may be used to carry the completed spray basket without any visible wire supports.

It will now be apparent that I have devised a novel and useful spray basket which embodies the features of advantage enumerated as desirable in the statement of the invention and the above description, and while I have in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent is:

1. In a device of the character stated, a skeleton wire frame, a skeleton wire handle extending from one side of the frame to the other and secured thereto, said handle being composed of a plurality of members, whose terminals are secured to opposite upper and lower portions of said frame, and strands of reed interwoven about said skeleton wire handle members and continued to the bottom of said frame so as to substantially conceal the same and to produce a handle of substantial thickness.

2. In a device of the character stated, a skeleton wire frame composed of lower and upper parallel frame members extending completely around the outer periphery of said skeleton frame, upright side frame wires connecting the two parallel frame wire members, bottom wires extending across and secured to the lower of the parallel frame members, a handle extending from one side of said skeleton frame to the other side thereof and composed of a plurality of members, whose terminals are secured to opposite portions of said lower and upper frames and strands of reed interwoven around said handle and continued to the bottom, so as to substantially conceal the same and produce a handle of substantial thickness.

3. In a device of the character stated, a skeleton wire frame having a central enlarged portion and rectangular extensions at diametrically opposed sides, parallel upper and lower frame members extending around and forming the outer periphery of said basket, upright frame members inter-connecting the two parallel frame members, a longitudinal bottom frame member extending from end to end and secured to the lower of the parallel frame members, transverse bottom frame members extending across and secured to the lower parallel frame member, and a plurality of radial bottom frame members extending across the central enlarged portion of the basket and secured to the lower parallel frame member, at diametrically opposed points, and also secured to each other at a common point of intersection.

4. In a device of the character stated, a skeleton wire frame having a central enlarged portion and rectangular extensions at diametrically opposed sides, parallel upper and lower frame members extending around and forming the outer periphery of said basket, upright frame members interconnecting the two parallel frame members, a longitudinal bottom frame member extending from end to end and secured to the lower of the parallel frame members, transverse bottom frame members extending across and secured to the lower parallel frame member, a plurality of radial bottom frame members extending across the central enlarged portion of the basket and secured to the lower parallel frame member, at diametrically opposed points, and also secured to each other at a common point of intersection, a handle wire extending across the basket and secured to two diametrically opposed points on the lower parallel frame member, and a brace at each side of said handle wire fixedly interposed between said side of the handle wire and two adjacent points on the upper parallel frame member.

5. In a device of the character stated, a skeleton wire frame having a central enlarged portion and rectangular extensions at diametrically opposed sides, parallel upper and lower frame members extending around and forming the outer periphery of said basket, upright frame members inter-connecting the two parallel frame members, a longitudinal bottom frame member extending from end to end and secured to the lower of the parallel frame members, transverse bottom frame members extending across and secured to the lower parallel frame member, and a plurality of radial bottom frame members extending across the central enlarged portion of the basket and secured to the lower parallel frame member, at diametrically opposed points, and also secured to each other at a common point of intersection, and a handle wire extending across the basket and secured to two diametrically opposed points on the lower parallel frame member, a brace at each side of said handle wire fixedly interposed between said side of the handle wire and two adjacent points on the upper parallel frame member, and strands of non-metallic basket weaving material, interwoven about said handle wire and brace members so as substantially to conceal the same and to produce a handle of substantial thickness.

6. In a device of the character stated, a skeleton wire frame composed of upper and lower members, a handle extending from one side of the frame to the other and secured thereto, brace wires composed of downwardly diverging limbs whose upper portions engage said handle and whose lower terminals are secured to said upper frame member, and non-metallic strands interwoven about said handle and brace wires so as to substantially conceal the same and to produce a handle of substantial thickness.

7. In a device of the character stated, a skeleton wire frame composed of lower and upper frame members extending completely around the outer periphery of said skeleton frame, upright side frame wires connecting the two parallel frame wire members, bottom wires extending across and secured to the lower of the parallel frame members, a handle extending from one side of said skeleton frame to the other side thereof and secured to the bottom frame, brace wires extending from said handle to the upper frame and strands of vegetable fiber interwoven around said handle and brace wires, so as to substantially conceal the same and produce a handle of substantial thickness.

8. In a device of the character stated, an elongated basket, comprising a central portion, and narrowed end extensions, composed of upper and lower wire frames tied together by vertical and horizontal members, a handle extending transversely of said central portion and having its lower ends secured to opposite portions of said lower frame and brace wires having downwardly diverged limbs, whose upper ends engage said handle and whose lower ends engage opposite portions of said upper frame.

9. In a device of the character stated, an elongated basket, comprising a central widened portion, and narrowed end extensions, composed of upper and lower wire frames tied together by vertical and horizontal members, a handle extending transversely of said central portion and having its lower ends secured to opposite portions of said lower frame, brace wires having downwardly diverged limbs, whose upper ends engage said handle and whose lower ends engage opposite portions of said upper frame, and a non-metallic covering for said handle and brace wires.

JOHN W. WALSH.